(12) United States Patent
Li

(10) Patent No.: US 11,061,735 B2
(45) Date of Patent: Jul. 13, 2021

(54) SYSTEM AND METHOD FOR OFFLOADING COMPUTATION TO STORAGE NODES IN DISTRIBUTED SYSTEM

(71) Applicant: Alibaba Group Holding Limited, Grand Cayman (KY)

(72) Inventor: Shu Li, Bothell, WA (US)

(73) Assignee: Alibaba Group Holding Limited, George Town (KY)

( * ) Notice: Subject to any disclaimer, the term of this patent is extended or adjusted under 35 U.S.C. 154(b) by 16 days.

(21) Appl. No.: 16/238,359

(22) Filed: Jan. 2, 2019

(65) Prior Publication Data

US 2020/0210243 A1 Jul. 2, 2020

(51) Int. Cl.
*G06F 9/50* (2006.01)
*G06F 16/907* (2019.01)
*H04L 29/08* (2006.01)

(52) U.S. Cl.
CPC .......... *G06F 9/5061* (2013.01); *G06F 16/907* (2019.01); *H04L 67/1095* (2013.01); *H04L 67/1097* (2013.01)

(58) Field of Classification Search
CPC combination set(s) only.
See application file for complete search history.

(56) References Cited

U.S. PATENT DOCUMENTS

| | | |
|---|---|---|
| 3,893,071 A | 7/1975 | Bossen |
| 4,562,494 A | 12/1985 | Bond |
| 4,718,067 A | 1/1988 | Peters |
| 4,775,932 A | 10/1988 | Oxley |
| 4,858,040 A | 8/1989 | Hazebrouck |
| 5,394,382 A | 2/1995 | Hu |
| 5,602,693 A | 2/1997 | Brunnett |

(Continued)

FOREIGN PATENT DOCUMENTS

| | | |
|---|---|---|
| JP | 2003022209 | 1/2003 |
| JP | 2011175422 | 9/2011 |

(Continued)

OTHER PUBLICATIONS

Ivan Picoli, Carla Pasco, Bjorn Jonsson, Luc Bouganim, Philippe Bonnet. "uFLIP-OC: Understanding Flash I/O Patterns on Open-Channel Solid-State Drives." APSys'17, Sep. 2017, Mumbai, India. pp. 1-7, 2017, <10.1145/3124680.3124741>. <hal-01654985>.

(Continued)

*Primary Examiner* — Tuan C Dao
(74) *Attorney, Agent, or Firm* — Shun Yao; Park, Vaughan, Fleming & Dowler LLP.

(57) ABSTRACT

One embodiment described herein provides a distributed computing system. The distributed computing system can include a compute cluster comprising one or more compute nodes and a storage cluster comprising a plurality of storage nodes. A respective compute node can be configured to: receive a request for a computation task; obtain path information associated with data required by the computation task; identify at least one storage node based on the obtained path information; send at least one computation instruction associated with the computation task to the identified storage node; and receive computation results from the identified storage node subsequently to the identified storage node performing the computation task.

16 Claims, 9 Drawing Sheets

(56) References Cited

U.S. PATENT DOCUMENTS

| | | |
|---|---|---|
| 5,732,093 A | 3/1998 | Huang |
| 5,802,551 A | 9/1998 | Komatsu |
| 5,930,167 A | 7/1999 | Lee |
| 6,098,185 A | 8/2000 | Wilson |
| 6,148,377 A | 11/2000 | Carter |
| 6,226,650 B1 | 5/2001 | Mahajan et al. |
| 6,457,104 B1 | 9/2002 | Tremaine |
| 6,658,478 B1 | 12/2003 | Singhal |
| 6,795,894 B1 | 9/2004 | Neufeld |
| 7,351,072 B2 | 4/2008 | Muff |
| 7,565,454 B2 | 7/2009 | Zuberi |
| 7,599,139 B1 | 10/2009 | Bombet |
| 7,953,899 B1 | 5/2011 | Hooper |
| 7,958,433 B1 | 6/2011 | Yoon |
| 8,085,569 B2 | 12/2011 | Kim |
| 8,144,512 B2 | 3/2012 | Huang |
| 8,166,233 B2 | 4/2012 | Schibilla |
| 8,260,924 B2 | 9/2012 | Koretz |
| 8,281,061 B2 | 10/2012 | Radke |
| 8,452,819 B1 | 5/2013 | Sorenson, III |
| 8,516,284 B2 | 8/2013 | Chan |
| 8,527,544 B1 | 9/2013 | Colgrove |
| 8,751,763 B1 | 6/2014 | Ramarao |
| 8,825,937 B2 | 9/2014 | Atkisson |
| 8,868,825 B1 | 10/2014 | Hayes |
| 8,904,061 B1 | 12/2014 | O'Brien, III |
| 9,015,561 B1 | 4/2015 | Hu |
| 9,043,545 B2 | 5/2015 | Kimmel |
| 9,088,300 B1 | 7/2015 | Chen |
| 9,092,223 B1 | 7/2015 | Pani |
| 9,129,628 B1 | 9/2015 | Fallone |
| 9,141,176 B1 | 9/2015 | Chen |
| 9,208,817 B1 | 12/2015 | Li |
| 9,280,472 B1 | 3/2016 | Dang |
| 9,280,487 B2 | 3/2016 | Candelaria |
| 9,311,939 B1 | 4/2016 | Malina |
| 9,336,340 B1 | 5/2016 | Dong |
| 9,436,595 B1 | 9/2016 | Benitez |
| 9,529,601 B1 | 12/2016 | Dharmadhikari |
| 9,588,698 B1 | 3/2017 | Karamcheti |
| 9,588,977 B1 | 3/2017 | Wang |
| 9,607,631 B2 | 3/2017 | Rausch |
| 9,747,202 B1 | 8/2017 | Shaharabany |
| 9,852,076 B1 | 12/2017 | Garg |
| 9,875,053 B1 | 1/2018 | Frid |
| 9,946,596 B2 | 4/2018 | Hashimoto |
| 10,013,169 B2 | 7/2018 | Fisher |
| 10,199,066 B1 | 2/2019 | Feldman |
| 10,229,735 B1 | 3/2019 | Natarajan |
| 10,235,198 B2 | 3/2019 | Qiu |
| 10,318,467 B2 | 6/2019 | Barzik et al. |
| 10,361,722 B2 | 7/2019 | Lee |
| 10,437,670 B1 | 10/2019 | Koltsidas |
| 10,642,522 B2 | 5/2020 | Li |
| 10,649,657 B2 | 5/2020 | Zaidman |
| 2001/0032324 A1* | 10/2001 | Slaughter .............. G06F 11/142 714/4.2 |
| 2002/0010783 A1 | 1/2002 | Primak |
| 2002/0039260 A1 | 4/2002 | Kilmer |
| 2002/0073358 A1 | 6/2002 | Atkinson |
| 2002/0095403 A1* | 7/2002 | Chandrasekaran ......................... G06F 12/0866 |
| 2002/0112085 A1* | 8/2002 | Berg .................. H04L 67/142 709/250 |
| 2002/0161890 A1 | 10/2002 | Chen |
| 2003/0145274 A1 | 7/2003 | Hwang |
| 2003/0163594 A1 | 8/2003 | Aasheim |
| 2003/0163633 A1 | 8/2003 | Aasheim |
| 2003/0217080 A1 | 11/2003 | White |
| 2004/0010545 A1 | 1/2004 | Pandya |
| 2004/0066741 A1 | 4/2004 | Dinker |
| 2004/0103238 A1 | 5/2004 | Avraham |
| 2004/0255171 A1 | 12/2004 | Zimmer |
| 2004/0267752 A1* | 12/2004 | Wong .................. G06F 16/10 |
| 2004/0268278 A1 | 12/2004 | Hoberman |
| 2005/0038954 A1 | 2/2005 | Saliba |
| 2005/0097126 A1 | 5/2005 | Cabrera |
| 2005/0149827 A1 | 7/2005 | Lambert |
| 2005/0174670 A1 | 8/2005 | Dunn |
| 2005/0177672 A1* | 8/2005 | Rao ..................... G06F 12/0866 711/3 |
| 2005/0177755 A1 | 8/2005 | Fung |
| 2005/0195635 A1 | 9/2005 | Conley |
| 2005/0235067 A1 | 10/2005 | Creta |
| 2005/0235171 A1 | 10/2005 | Igari |
| 2006/0031709 A1 | 2/2006 | Hiraiwa |
| 2006/0156012 A1 | 7/2006 | Beeson |
| 2007/0033323 A1 | 2/2007 | Gorobets |
| 2007/0061502 A1 | 3/2007 | Lasser |
| 2007/0101096 A1 | 5/2007 | Gorobets |
| 2007/0266011 A1* | 11/2007 | Rohrs ................. G06F 16/9535 |
| 2007/0283081 A1 | 12/2007 | Lasser |
| 2007/0285980 A1 | 12/2007 | Shimizu |
| 2008/0034154 A1 | 2/2008 | Lee |
| 2008/0065805 A1 | 3/2008 | Wu |
| 2008/0082731 A1 | 4/2008 | Karamcheti |
| 2008/0112238 A1 | 5/2008 | Kim |
| 2008/0301532 A1 | 12/2008 | Uchikawa |
| 2009/0006667 A1 | 1/2009 | Lin |
| 2009/0089544 A1* | 4/2009 | Liu .......................... G06F 8/45 712/30 |
| 2009/0113219 A1 | 4/2009 | Aharonov |
| 2009/0183052 A1 | 7/2009 | Kanno |
| 2009/0282275 A1 | 11/2009 | Yermalayeu |
| 2009/0287956 A1 | 11/2009 | Flynn |
| 2009/0307249 A1 | 12/2009 | Koifman |
| 2009/0310412 A1 | 12/2009 | Jang |
| 2010/0169470 A1 | 7/2010 | Takashige |
| 2010/0217952 A1 | 8/2010 | Iyer |
| 2010/0229224 A1 | 9/2010 | Etchegoyen |
| 2010/0325367 A1 | 12/2010 | Kornegay |
| 2010/0332922 A1 | 12/2010 | Chang |
| 2011/0031546 A1 | 2/2011 | Uenaka |
| 2011/0055458 A1 | 3/2011 | Kuehne |
| 2011/0055471 A1 | 3/2011 | Thatcher |
| 2011/0099418 A1 | 4/2011 | Chen |
| 2011/0153903 A1 | 6/2011 | Hinkle |
| 2011/0161784 A1 | 6/2011 | Selinger |
| 2011/0191525 A1 | 8/2011 | Hsu |
| 2011/0218969 A1 | 9/2011 | Anglin |
| 2011/0231598 A1 | 9/2011 | Hatsuda |
| 2011/0239083 A1 | 9/2011 | Kanno |
| 2011/0252188 A1 | 10/2011 | Weingarten |
| 2011/0258514 A1 | 10/2011 | Lasser |
| 2011/0292538 A1 | 12/2011 | Haga |
| 2011/0299317 A1 | 12/2011 | Shaeffer |
| 2011/0302353 A1 | 12/2011 | Confalonieri |
| 2012/0084523 A1 | 4/2012 | Littlefield |
| 2012/0089774 A1 | 4/2012 | Kelkar |
| 2012/0096330 A1 | 4/2012 | Przybylski |
| 2012/0117399 A1 | 5/2012 | Chan |
| 2012/0147021 A1 | 6/2012 | Cheng |
| 2012/0159099 A1 | 6/2012 | Lindamood |
| 2012/0159289 A1 | 6/2012 | Piccirillo |
| 2012/0173792 A1 | 7/2012 | Lassa |
| 2012/0203958 A1 | 8/2012 | Jones |
| 2012/0210095 A1 | 8/2012 | Nellans |
| 2012/0246392 A1 | 9/2012 | Cheon |
| 2012/0278579 A1 | 11/2012 | Goss |
| 2012/0284587 A1 | 11/2012 | Yu |
| 2012/0331207 A1 | 12/2012 | Lassa |
| 2013/0024605 A1 | 1/2013 | Sharon |
| 2013/0054822 A1 | 2/2013 | Mordani |
| 2013/0061029 A1 | 3/2013 | Huff |
| 2013/0073798 A1 | 3/2013 | Kang |
| 2013/0080391 A1 | 3/2013 | Raichstein |
| 2013/0145085 A1 | 6/2013 | Yu |
| 2013/0145089 A1 | 6/2013 | Eleftheriou |
| 2013/0151759 A1 | 6/2013 | Shim |
| 2013/0159251 A1 | 6/2013 | Skrenta |
| 2013/0166820 A1 | 6/2013 | Batwara |
| 2013/0173845 A1 | 7/2013 | Aslam |
| 2013/0191601 A1 | 7/2013 | Peterson |
| 2013/0219131 A1 | 8/2013 | Alexandron |

(56) References Cited

U.S. PATENT DOCUMENTS

| | | |
|---|---|---|
| 2013/0238955 A1 | 9/2013 | D'Abreu |
| 2013/0254622 A1 | 9/2013 | Kanno |
| 2013/0318283 A1 | 11/2013 | Small |
| 2014/0006688 A1 | 1/2014 | Yu |
| 2014/0019650 A1 | 1/2014 | Li |
| 2014/0025638 A1 | 1/2014 | Hu |
| 2014/0082273 A1 | 3/2014 | Segev |
| 2014/0095827 A1 | 4/2014 | Wei |
| 2014/0108414 A1 | 4/2014 | Stillerman |
| 2014/0164447 A1* | 6/2014 | Tarafdar ............... G06F 16/182 707/827 |
| 2014/0181532 A1 | 6/2014 | Camp |
| 2014/0195564 A1 | 7/2014 | Talagala |
| 2014/0233950 A1 | 8/2014 | Luo |
| 2014/0250259 A1 | 9/2014 | Ke |
| 2014/0279927 A1 | 9/2014 | Constantinescu |
| 2014/0304452 A1 | 10/2014 | De La Iglesia |
| 2014/0310574 A1 | 10/2014 | Yu |
| 2014/0359229 A1 | 12/2014 | Cota-Robles |
| 2014/0365707 A1 | 12/2014 | Talagala |
| 2015/0019798 A1 | 1/2015 | Huang |
| 2015/0082317 A1 | 3/2015 | You |
| 2015/0106556 A1 | 4/2015 | Yu |
| 2015/0106559 A1 | 4/2015 | Cho |
| 2015/0121031 A1 | 4/2015 | Feng |
| 2015/0142752 A1 | 5/2015 | Chennamsetty |
| 2015/0199234 A1 | 7/2015 | Choi |
| 2015/0227316 A1 | 8/2015 | Warfield |
| 2015/0234845 A1* | 8/2015 | Moore ................. G06F 16/137 707/747 |
| 2015/0269964 A1 | 9/2015 | Fallone |
| 2015/0277937 A1 | 10/2015 | Swanson |
| 2015/0286477 A1* | 10/2015 | Mathur ............... G06F 3/04847 717/101 |
| 2015/0294684 A1 | 10/2015 | Qjang |
| 2015/0301964 A1 | 10/2015 | Brinicombe |
| 2015/0304108 A1 | 10/2015 | Obukhov |
| 2015/0347025 A1 | 12/2015 | Law |
| 2015/0363271 A1 | 12/2015 | Haustein |
| 2015/0363328 A1 | 12/2015 | Candelaria |
| 2015/0372597 A1 | 12/2015 | Luo |
| 2016/0014039 A1 | 1/2016 | Reddy |
| 2016/0026575 A1 | 1/2016 | Samanta |
| 2016/0041760 A1 | 2/2016 | Kuang |
| 2016/0048341 A1 | 2/2016 | Constantinescu |
| 2016/0077749 A1 | 3/2016 | Ravimohan |
| 2016/0077968 A1 | 3/2016 | Sela |
| 2016/0098344 A1 | 4/2016 | Gorobets |
| 2016/0098350 A1 | 4/2016 | Tang |
| 2016/0103631 A1 | 4/2016 | Ke |
| 2016/0110254 A1 | 4/2016 | Cronie |
| 2016/0154601 A1 | 6/2016 | Chen |
| 2016/0155750 A1 | 6/2016 | Yasuda |
| 2016/0162187 A1 | 6/2016 | Lee |
| 2016/0179399 A1 | 6/2016 | Melik-Martirosian |
| 2016/0203000 A1 | 7/2016 | Parmar |
| 2016/0232103 A1 | 8/2016 | Schmisseur |
| 2016/0234297 A1* | 8/2016 | Ambach ............. H04L 67/1008 |
| 2016/0239074 A1 | 8/2016 | Lee |
| 2016/0239380 A1 | 8/2016 | Wideman |
| 2016/0274636 A1 | 9/2016 | Kim |
| 2016/0306853 A1 | 10/2016 | Sabaa |
| 2016/0321002 A1 | 11/2016 | Jung |
| 2016/0342345 A1 | 11/2016 | Kankani |
| 2016/0343429 A1 | 11/2016 | Nieuwejaar |
| 2016/0350002 A1 | 12/2016 | Vergis |
| 2016/0350385 A1 | 12/2016 | Poder |
| 2016/0364146 A1 | 12/2016 | Kuttner |
| 2017/0010652 A1 | 1/2017 | Huang |
| 2017/0075583 A1 | 3/2017 | Alexander |
| 2017/0075594 A1 | 3/2017 | Badam |
| 2017/0091110 A1 | 3/2017 | Ash |
| 2017/0109199 A1* | 4/2017 | Chen ................... G06F 9/5027 |
| 2017/0109232 A1 | 4/2017 | Cha |
| 2017/0147499 A1 | 5/2017 | Mohan |
| 2017/0161202 A1 | 6/2017 | Erez |
| 2017/0162235 A1 | 6/2017 | De |
| 2017/0168986 A1 | 6/2017 | Sajeepa |
| 2017/0177217 A1 | 6/2017 | Kanno |
| 2017/0177259 A1 | 6/2017 | Motwani |
| 2017/0199823 A1 | 7/2017 | Hayes |
| 2017/0212708 A1 | 7/2017 | Suhas |
| 2017/0220254 A1 | 8/2017 | Warfield |
| 2017/0221519 A1 | 8/2017 | Matsuo |
| 2017/0228157 A1 | 8/2017 | Yang |
| 2017/0242722 A1 | 8/2017 | Qiu |
| 2017/0249162 A1 | 8/2017 | Tsirkin |
| 2017/0262178 A1 | 9/2017 | Hashimoto |
| 2017/0262217 A1 | 9/2017 | Pradhan |
| 2017/0269998 A1 | 9/2017 | Sunwoo |
| 2017/0285976 A1 | 10/2017 | Durham |
| 2017/0286311 A1 | 10/2017 | Juenemann |
| 2017/0322888 A1 | 11/2017 | Booth |
| 2017/0344470 A1 | 11/2017 | Yang |
| 2017/0344491 A1 | 11/2017 | Pandurangan |
| 2017/0353576 A1 | 12/2017 | Guim Bernat |
| 2018/0024772 A1 | 1/2018 | Madraswala |
| 2018/0024779 A1 | 1/2018 | Kojima |
| 2018/0033491 A1 | 2/2018 | Marelli |
| 2018/0052797 A1 | 2/2018 | Barzik |
| 2018/0067847 A1 | 3/2018 | Oh |
| 2018/0074730 A1 | 3/2018 | Inoue |
| 2018/0076828 A1 | 3/2018 | Kanno |
| 2018/0088867 A1 | 3/2018 | Kaminaga |
| 2018/0107591 A1 | 4/2018 | Smith |
| 2018/0143780 A1 | 5/2018 | Cho |
| 2018/0165038 A1 | 6/2018 | Authement |
| 2018/0167268 A1 | 6/2018 | Liguori |
| 2018/0173620 A1 | 6/2018 | Cen |
| 2018/0188970 A1 | 7/2018 | Liu |
| 2018/0189182 A1 | 7/2018 | Wang |
| 2018/0212951 A1 | 7/2018 | Goodrum |
| 2018/0226124 A1 | 8/2018 | Perner |
| 2018/0232113 A1 | 8/2018 | Badam |
| 2018/0270110 A1 | 9/2018 | Chugtu |
| 2018/0293014 A1 | 10/2018 | Ravimohan |
| 2018/0300203 A1 | 10/2018 | Kathpal |
| 2018/0329776 A1 | 11/2018 | Lai |
| 2018/0336921 A1 | 11/2018 | Ryun |
| 2018/0356992 A1 | 12/2018 | Lamberts |
| 2018/0373428 A1 | 12/2018 | Kan |
| 2018/0373655 A1 | 12/2018 | Liu |
| 2018/0373664 A1 | 12/2018 | Vijayrao |
| 2019/0012111 A1 | 1/2019 | Li |
| 2019/0065085 A1 | 2/2019 | Jean |
| 2019/0073262 A1 | 3/2019 | Chen |
| 2019/0087115 A1 | 3/2019 | Li |
| 2019/0087328 A1 | 3/2019 | Kanno |
| 2019/0171532 A1 | 6/2019 | Abadi |
| 2019/0205206 A1 | 7/2019 | Hornung |
| 2019/0227927 A1 | 7/2019 | Miao |
| 2019/0272242 A1 | 9/2019 | Kachare |
| 2019/0278654 A1 | 9/2019 | Kaynak |
| 2019/0339998 A1 | 11/2019 | Momchilov |
| 2019/0377632 A1 | 12/2019 | Oh |
| 2019/0377821 A1 | 12/2019 | Pleshachkov |
| 2019/0391748 A1 | 12/2019 | Li |
| 2020/0004456 A1 | 1/2020 | Williams |
| 2020/0004674 A1 | 1/2020 | Williams |
| 2020/0013458 A1 | 1/2020 | Schreck |
| 2020/0042223 A1 | 2/2020 | Li |
| 2020/0097189 A1 | 3/2020 | Tao |
| 2020/0159425 A1 | 5/2020 | Flynn |

FOREIGN PATENT DOCUMENTS

| | | |
|---|---|---|
| WO | 9418634 | 8/1994 |
| WO | 1994018634 | 8/1994 |

OTHER PUBLICATIONS

EMC Powerpath Load Balancing and Failover Comparison with native MPIO operating system solutions. Feb. 2011.

(56) References Cited

OTHER PUBLICATIONS

Tsuchiya, Yoshihiro et al. "DBLK: Deduplication for Primary Block Storage", MSST 2011, Denver, CO, May 23-27, 2011 pp. 1-5.
Chen Feng, et al. "CAFTL: A Content-Aware Flash Translation Layer Enhancing the Lifespan of Flash Memory based Solid State Devices"< Fast '11, San Jose, CA Feb. 15-17, 2011, pp. 1-14.
Wu, Huijun et al. "HPDedup: A Hybrid Prioritized Data Deduplication Mechanism for Primary Storage in the Cloud", Cornell Univ. arXiv: 1702.08153v2[cs.DC], Apr. 16, 2017, pp. 1-14.
WOW: Wise Ordering for Writes—Combining Spatial and Temporal Locality in Non-Volatile Caches by Gill (Year: 2005).
Helen H. W. Chan et al. "HashKV: Enabling Efficient Updated in KV Storage via Hashing", https://www.usenix.org/conference/atc18/presentation/chan, (Year: 2018).
https://web.archive.org/web/20071130235034/http://en.wikipedia.org:80/wiki/logical_block_addressing wikipedia screen shot retriefed on wayback Nov. 20, 2007 showing both physical and logical addressing used historically to access data on storage devices (Year: 2007).
S. Hong and D. Shin, "NAND Flash-Based Disk Cache Using SLC/MLC Combined Flash Memory," 2010 International Workshop on Storage Network Architecture and Parallel I/Os, Incline Village, NV, 2010, pp. 21-30.
Arpaci-Dusseau et al. "Operating Systems: Three Easy Pieces", Originally published 2015; Pertinent: Chapter 44; flash-based SSDs, available at http://pages.cs.wisc.edu/~remzi/OSTEP/.
Jimenex, X., Novo, D. and P. Ienne, "Pheonix:Reviving MLC Blocks as SLC to Extend NAND Flash Devices Lifetime," Design, Automation & Text in Europe Conference & Exhibition (Date), 2013.
Yang, T. Wu, H. and W. Sun, "GD-FTL: Improving the Performance and Lifetime of TLC SSD by Downgrading Worn-out Blocks," IEEE 37th International Performance Computing and Communications Conference (IPCCC), 2018.

* cited by examiner

SYSTEM AND METHOD FOR OFFLOADING COMPUTATION TO STORAGE NODES IN DISTRIBUTED SYSTEM

BACKGROUND

Field

This disclosure is generally related to distributed computing systems. More specifically, this disclosure is related to a method and system that improves the performance of a distributed computing system.

Related Art

A distributed computing system can refer to a system whose components are located on different networked computers, which communicate and coordinate their actions to achieve a common goal. Typical distributed computing systems can include two types of nodes: compute nodes and storage nodes. Computing nodes can be responsible for receiving and processing incoming requests from users or applications, whereas storage nodes can be responsible for storing data. A typical system operation may include a compute node receiving a user request, obtaining necessary data from a storage node, processing the obtained data according to the user request, and sending the processed or updated data back to the storage node for storage. Such a process can involve data being passed between the compute node and the storage node multiple times. Moving large amounts of data can consume considerable amounts of time and bandwidth, and can become a significant bottleneck for performance improvement in the distributed system.

SUMMARY

One embodiment described herein provides a distributed computing system. The distributed computing system can include a compute cluster comprising one or more compute nodes and a storage cluster comprising a plurality of storage nodes. A respective compute node can be configured to: receive a request for a computation task; obtain path information associated with data required by the computation task; identify at least one storage node based on the obtained path information; send at least one computation instruction associated with the computation task to the identified storage node; and receive computation results from the identified storage node subsequently to the identified storage node performing the computation task.

In a variation on this embodiment, the distributed computing system further includes at least one master node. The master node can be configured to maintain a compute context associated with the data, generate data-placement paths based on the compute context, and provide the path information according to the data-placement paths to the compute node.

In a variation on this embodiment, the compute node can be further configured to partition the computation task into a number of sub-tasks based on the path information, which indicate locations of the data on the plurality of storage nodes. The computation task is partitioned in such a way that a respective sub-task only requires data stored on a single storage node. The compute node can then send the respective sub-task to the corresponding single storage node to allow the single storage node to execute the respective sub-task.

In a further variation, the compute node is further configured to receive computation results from multiple storage nodes executing the sub-tasks to generate a combined result.

In a variation on this embodiment, the compute node can be further configured to: receive data to be written into the storage cluster, group the to-be-written data into one or more data chunks based on compute context associated with the to-be-written data, and submit the compute context associated with the to-be-written data to a master node of the distributed system.

In a further variation, the compute node can be further configured to: receive, from the master node, data-placement paths for the data chunks, with a respective data-placement path indicating a storage node for storing a corresponding data chunk; and write the data chunks into corresponding storage nodes identified by the data-placement paths.

In a further variation, the master node can be configured to store the compute context as part of metadata of the to-be-written data.

In a variation on this embodiment, the identified storage node can be further configured to execute the computing task, determine whether execution of the computing task updates the data, and send a data-update notification to a master node of the distributed computing system in response to determining that the data is updated.

In a further variation, the master node can be configured to update metadata associated with the data in response to receiving the data-update notification, perform a lookup for data paths associated with replicas of the data stored on other storage nodes within the storage cluster, and send the data paths associated with the replicas to the identified storage node.

In a further variation, the identified storage node can be further configured to synchronize the replicas of the data stored on the other storage nodes, in response to receiving the data paths associated with the replicas.

BRIEF DESCRIPTION OF THE FIGURES

In the figures, like reference numerals refer to the same figure elements.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present disclosure solve the problem of improving the performance of a distributed computing system by offloading data-intensive computation tasks from the compute node to the storage nodes. More specifically, in order to offload the computational tasks to the storage nodes, the system can combine the computing-task partition with the data placement to ensure that data needed for the computation is stored locally on the storage node performing the computation. To do so, the master node of the distributed system needs to keep the data context used for computation in addition to the distributed storage logic. This approach can significantly reduce the data amount loaded from storage clusters to the compute node, thus providing the benefits of reducing system latency, network bandwidth consumption, required capacity of the compute cache, and the overall CPU consumption.

Distributed Computing System

Figure 1:
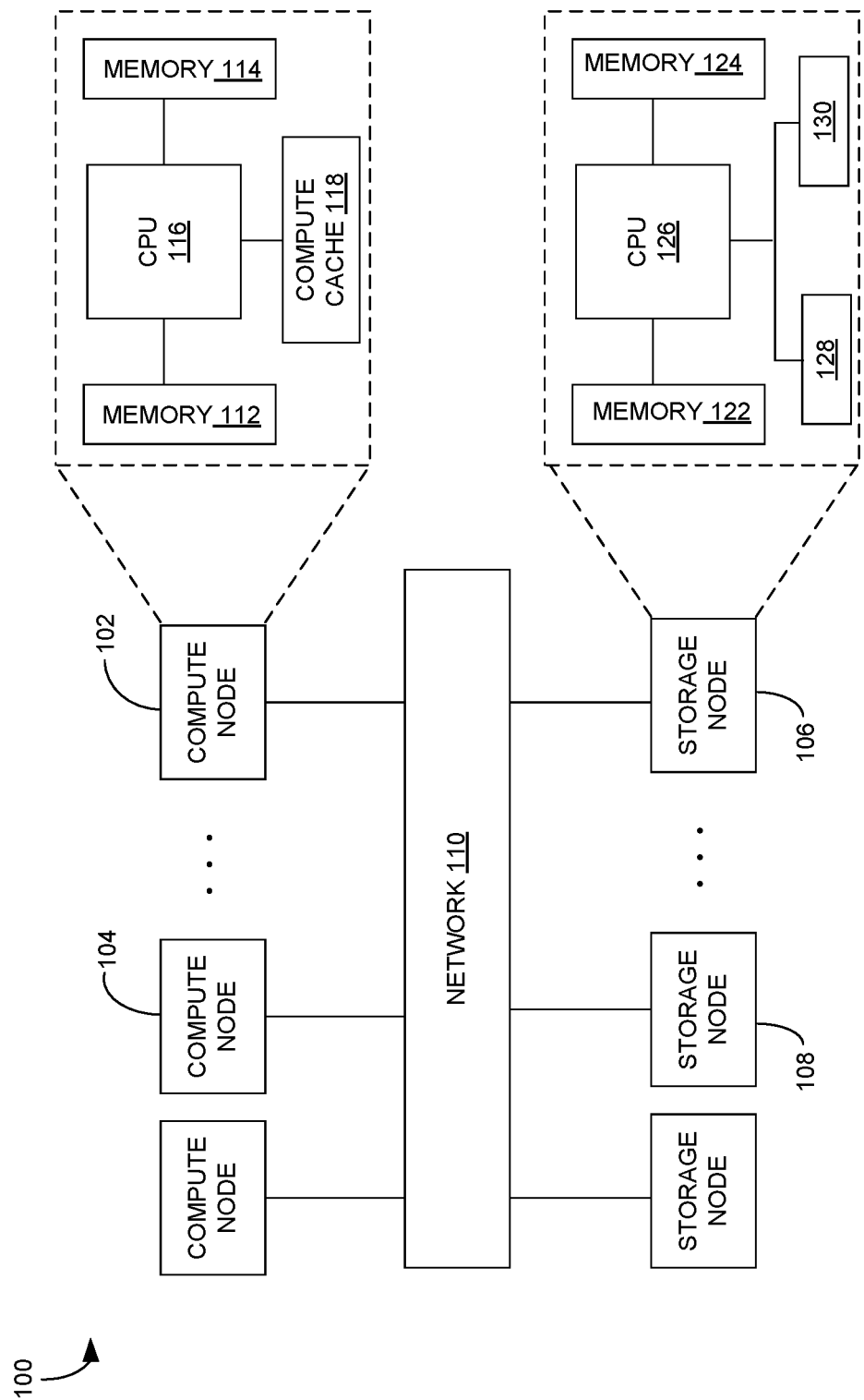
FIG. 1 illustrates the architecture of a distributed computing system.

FIG. 1 illustrates the architecture of a distributed computing system. Distributed computing system 100 can include a compute cluster comprising a number of compute nodes (e.g., compute nodes 102 and 104) and a storage cluster comprising a number of storage nodes (e.g., storage nodes 106 and 108). The compute nodes and the storage nodes can be coupled to each other via a network 110, which can include a high-speed Ethernet. Network 110 can also include other types of wired or wireless network.

As shown in FIG. 1, a compute node can include one or more memories, CPUs, and at least one cache. For example, compute node 102 can include memories 112 and 114, CPU(s) 116, and a compute cache 118. In some embodiments, memories 112 and 114 can include large capacity dual in-line memory modules (DIMMs); CPU(s) 116 can include one or more powerful CPUs (which can include single-core or multi-core CPUs) that can handle computation-intensive tasks; and compute cache 118 can be implemented using solid-state drives (SSDs). The compute node can be designed and configured to provide high efficiency computation and processing. For example, CPU(s) 116 can include computation-intensive CPUs.

A storage node can also include memories and CPUs. For example, storage node 106 can include memories 122 and 124, and CPU(s) 126. Compared to those in the compute node, the CPUs in the storage node can be less powerful (e.g., having a lower processing speed) and the memories in the storage node can have less capacity. Storage node 106 can further include a number of storage modules, such as storage modules 128 and 130. In some embodiments, storage modules 128 and 130 can include large capacity SSDs or hard disk drives (HDDs). Each storage node can be designed and configured to provide high-performance large-capacity storage. Moreover, the plurality of storage nodes within the distributed system can form a storage cluster, which not only can provide the desired large storage capacity but also can provide sufficient reliability by employing multiple replicas.

In a conventional distributed system, the compute nodes perform all required computation and data processing. For example, when a user makes a request for certain data processing (e.g., updating a stored table) tasks, a compute node receives the user request and fetches the needed data (e.g., the stored table) from the storage cluster. Subsequent to processing the data, the compute node returns the processed data (e.g., the updated table) to the storage cluster for storage. As one can see, even for a simple processing task, the data needs to travel back and forth at least twice between the compute node and the storage node. A compute cache (e.g., compute cache 118) can be implemented to improve the performance of the distributed system by reducing data movements. However, the capacity of the compute cache is limited, and in the event of a cache miss, the data still needs to be fetched from the storage cluster.

The back-and-forth movements of the data not only increase the system latency (computation happens after data is loaded from the storage cluster) but also increases the operation complexity. More specifically, the long data write path means that synchronization among the multiple replicas of the data will be needed. Moreover, the loading and writing of the data can consume a large amount of bandwidth, thus leading to degraded system performance.

Schemes for Offloading Computations to Storage Nodes

To improve the performance of the distributed system, in some embodiments, certain computation tasks (e.g., data-intensive computation tasks) can be offloaded from the compute nodes to one or more storage nodes, thus reducing system latency and the amount of data movement. For example, certain e-commerce applications, such as updating product inventory or adjusting product prices, can be data-intensive, because the number of entries in the to-be-updated table can be huge. On the other hand, such computations are relatively simple and often do not need powerful CPUs. It is more efficient to perform such computations (e.g., table updates) at the storage node where the data is stored. In a distributed system, data needed for a computation may be scattered among multiple storage nodes. To ensure that a storage node performing the computation has all of the data needed for the computation, the system needs to make sure, during data placement, that data placed onto the storage node can meet the requirements of the computation. In order to do so, the data-placement layer needs to have, in addition to distributed-storage logic information, compute context information associated with the to-be-stored data. When placing data, along with its replicas, among the plurality of storage nodes within the distributed system, a compute node can take into consideration both the distributed-storage logic and the compute context.

Figure 2:
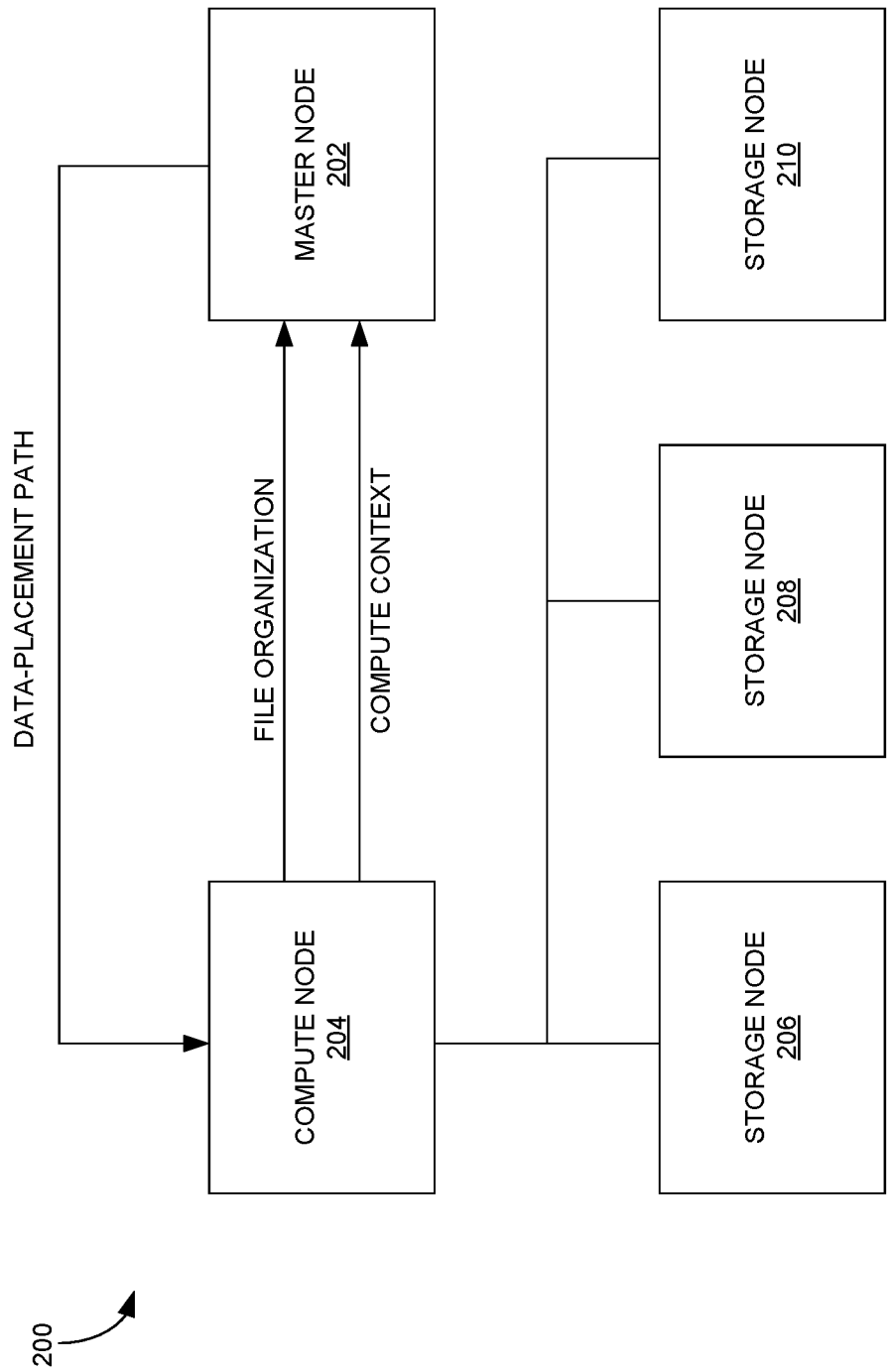
FIG. 2 presents a diagram illustrating an exemplary data-placement system, according to one embodiment.

FIG. 2 presents a diagram illustrating an exemplary data-placement system, according to one embodiment. Data-placement system 200 can be a distributed system, and can include one or more master nodes (e.g., master node 202), a plurality of compute nodes (e.g., compute node 204), and a plurality of storage nodes (e.g., storage nodes 206, 208, and 210).

In a distributed system implementing the master/slave architecture, a master node (also referred to as a primary node) (e.g., master node 202) can be in charge of distributing data (e.g., assigning data-placement paths) among the storage nodes. A compute node can group data and write data to the storage nodes based on the data-placement paths assigned by the master node. For example, master node 202 can send data-placement path information to compute node 204, which writes the data to storage nodes 206, 208, and 210 based on the data-placement path. A master node can be a compute node or a storage node.

As discussed previously, to improve efficiency, data needed for a computation should be grouped together and stored on the same storage node performing the computation. In other words, data grouping and data-placement path-assigning need to take into consideration the compute context of the data. In some embodiments, the compute nodes send the file-organization information along with the data context used for computation to the master node, which uses such information to assign a data-placement path and send the data-placement path to the compute nodes.

Figure 3:
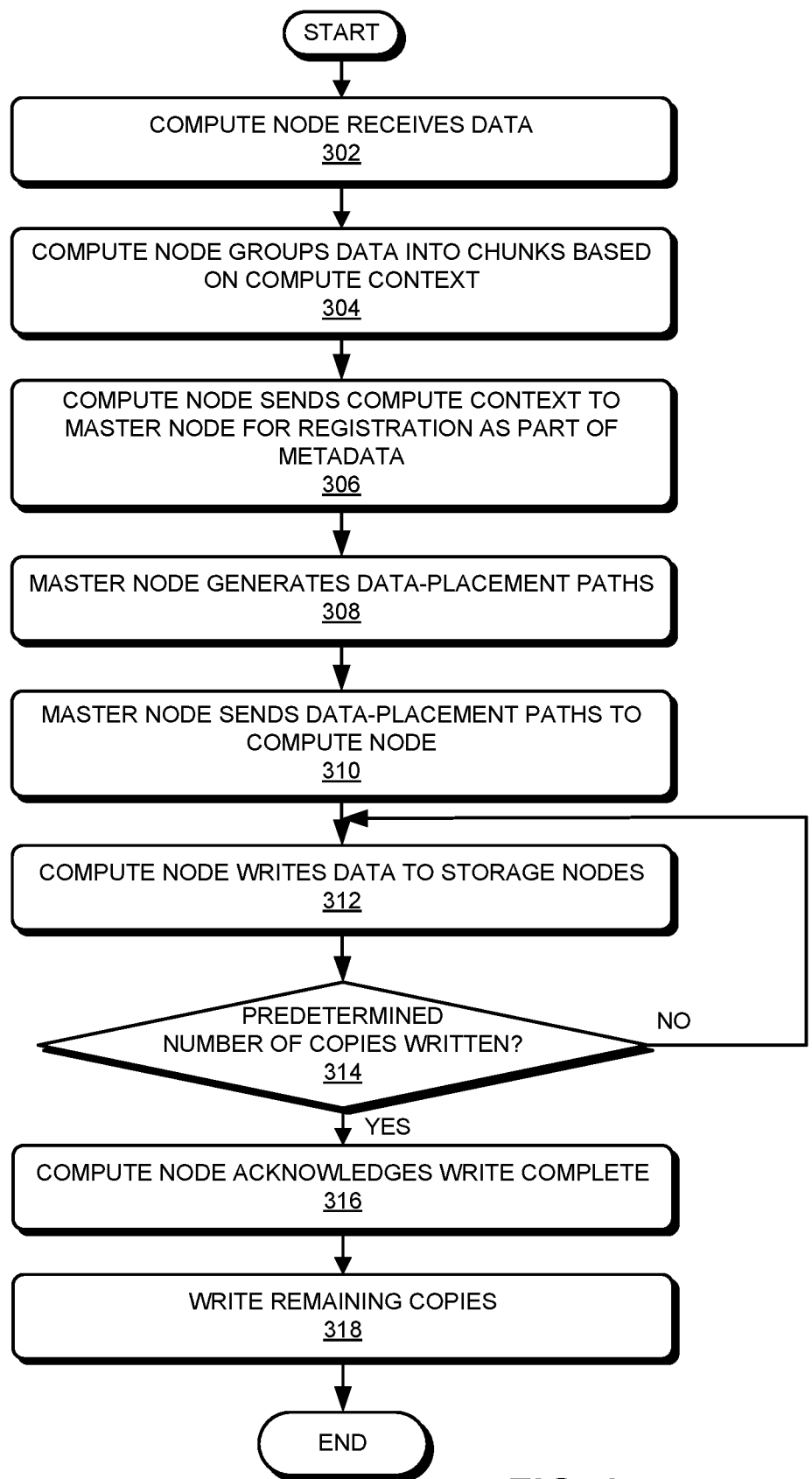
FIG. 3 presents a flowchart illustrating an exemplary process for writing data in the distributed system, according to one embodiment.

FIG. 3 presents a flowchart illustrating an exemplary process for writing data in the distributed system, according to one embodiment. During operation, a compute node received user data to be stored in the distributed system (operation 302). The compute node can merge or group the received data into one or more chunks based on the compute context associated with the data (operation 304). The compute context associated with the data can include but is not limited to: the data type, the source of the data, the format of the data, possible computations that can be performed on the data, etc. Data grouped into a particular chunk may share similar compute contexts and is more likely to participate in the same computation task or sub-task. The compute node can also send the compute context associated with the data to the master node, which registered the compute context as part of the metadata (operation 306).

The master node can then generate data-placement paths based on the data grouping and other data-storage considerations (e.g., current loads of the storage nodes, redundancy requirement, etc.) (operation 308) and send the data-placement paths to the compute node (operation 310). The master node maintains both the compute context and the data-placement paths for each data chunk. The compute node can then write the data to corresponding storage nodes based on the received data-placement paths (operation 312). The compute node needs to make sure that the individual data chunks are kept together and written into a same storage node and multiple copies of the data chunk can be written into multiple different storage nodes. In some embodiments, to provide redundancy, at least three copies of each data chunk are written into the storage nodes, with each copy being written into a different storage node.

The system can determine whether a predetermined number of copies of each chunk have been successfully written (operation 314). For example, when three copies are to be written, the system can determine whether at least two copies of each data chunk have been successfully written. In some embodiments, each time a copy is written successfully into a storage node, the storage node can report to the compute node. If a sufficient number of copies have been successfully written, the compute node can acknowledge that the write is complete and the data is available (operation 316). If not, the compute node continues to write. This way, the data can be available for users or applications before all copies are written, thus reducing latency. The compute node can finish writing the remaining data copies (e.g., the last copy of the three data copies) to the storage nodes (operation 318).

Figure 4:
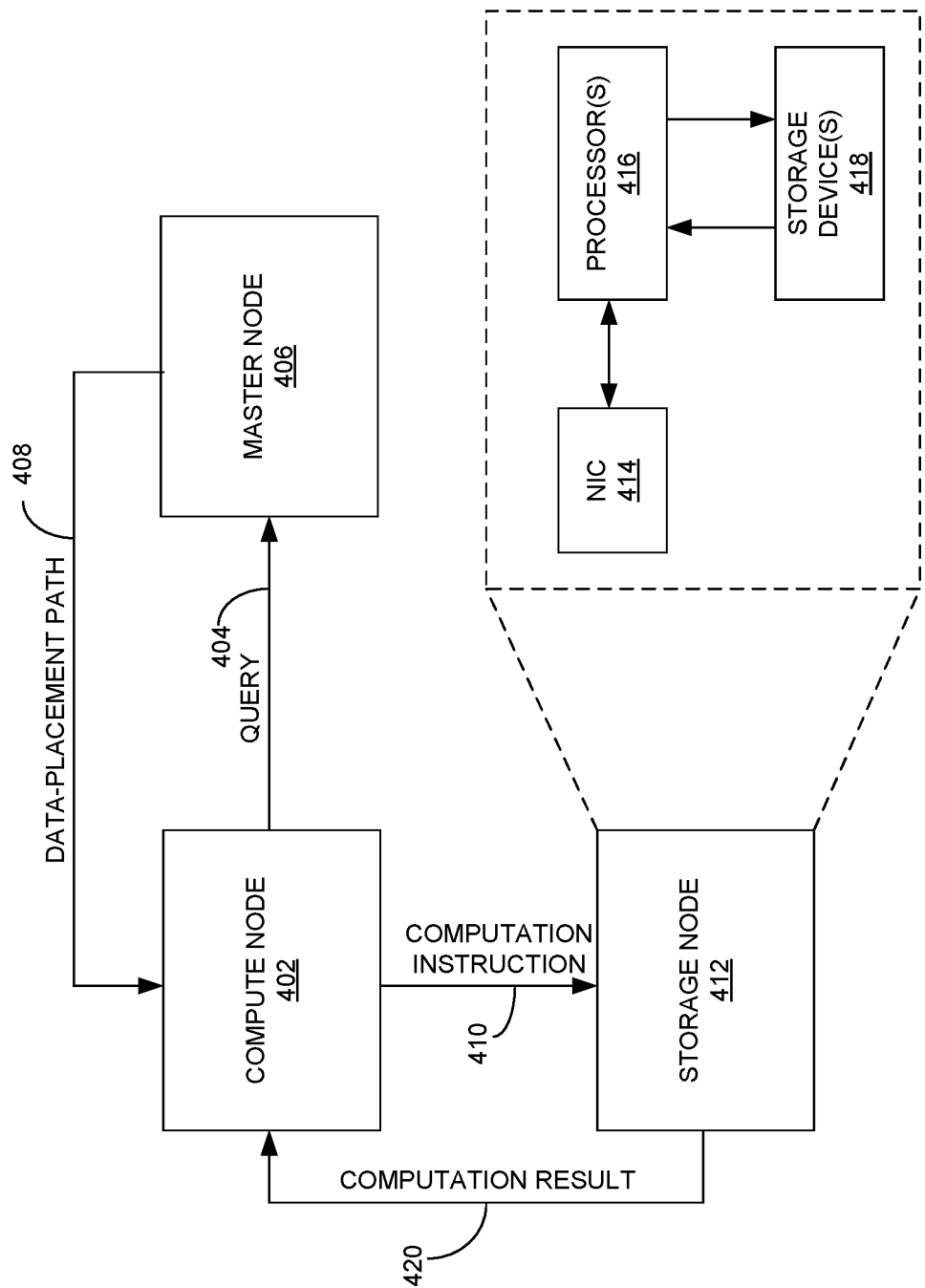
FIG. 4 presents a diagram illustrating the flow of information during computation, according to one embodiment.

FIG. 4 presents a diagram illustrating the flow of information during computation, according to one embodiment. During operation, a compute node 402 can launch a computation task. In some embodiments, compute node 402 can send a query 404 to a master node 406 to request data-placement information associated with the computation. For example, if the computation involves updating a table, compute node 402 can query master node 406 about the storage locations of the table content (e.g., columns and/or rows of the table). Master node 406 can respond to query 404 using the stored data-placement path information 408. Using the table update as an example, master node 406 can send storage information associated with the table (e.g., which portion of the table is stored at a particular storage node) to compute node 402.

In some embodiments, compute node 402 can then partition the computation task into a plurality of sub-tasks based on the compute context of the data. More specifically, compute node 402 can partition the computation task in such a way that each sub-task only requires data stored on a single storage node. This way, the single storage node can perform the sub-task without the need to request additional data from other storage nodes. For example, when partitioning the computation task of updating a table into a number of sub-tasks, compute node 402 can partition the computation task based on the way the table is stored in multiple storage nodes. A sub-task can include updating a section (e.g., a set of rows or columns) of the table, with such a section being stored on a particular storage node. Hence, that particular storage node can perform the sub-task without the need to obtain additional table content from other storage nodes. Note that task partitioning can be optional. When the computation task is relatively small, compute node 402 may chose not to partition the computation task.

Compute node 402 can send computation instruction 410 to corresponding storage node 412. When the computation task has been divided into a plurality of sub-tasks, compute node 402 can send the computation instruction for each sub-task to its corresponding storage node. For distributed systems, the data often have multiple replicas stored at multiple storage nodes, and master node 406 may send path information associated with the multiple data replicas to compute node 402. However, instead of offloading the computation task to the multiple storage nodes storing the multiple replicas, compute node 402 offloads the computation task to a single replica of the data (e.g., to the one or more storage nodes that store the single replica). To do so, compute node 402 randomly selects a data replica, identifies one or more storage nodes storing the data replica, and sends the computation instruction for each sub-task to the corresponding storage node. For example, a replica of a table may be stored in three different storage nodes, with each storage node storing a section of the table. Accordingly, compute node 402 may send the computation instruction for updating each section of the table to each corresponding storage node. Alternatively, each of the three storage nodes may store a replica of the entire table, and only one replica is selected for each sub-task. More specifically, instead of offloading the table-updating task to one storage node, compute node 402 can partition the table-updating task into three sub-tasks, with each sub-task updating a portion of the table. Compute node 402 can then send the computation instruction for each sub-task to each of the three storage nodes. When selecting which replica to send the computation task to, compute node 402 may perform load balancing (i.e., to ensure that the sub-tasks are sent evenly among the storage nodes to avoid heavy load on any particular storage node). Note that each computation instruction only affects a portion of the table, and the combined affected portions from the three storage nodes form a complete replica of the table.

FIG. 4 also shows that storage node 412 can include a network interface card (NIC) 414, processor(s) 416, and storage device(s) 418. Processor(s) 416 can include any type of processing unit, such as a central processing unit (CPU), graphics processing unit (GPU), field-programming gate array (FPGA), etc. Storage device(s) 418 can include hard-disk drives (HDDs), such as conventional-magnetic recording (CMR) HDDs, shingled-magnetic recording (SMR) HDDs, solid-state drives (SSDs), etc. A typical storage node can have a relatively large storage capacity. Subsequent to receiving the computation instruction, processor(s) 416 can load data from the local drives (e.g., storage device(s) 418) to perform the computation task or sub-task based on the computation instruction. Storage node 412 can then return computation result 420 to compute node 402. For a partitioned computation task, compute node 402 gathers computation results from all sub-tasks. Compute node 402 can further return the computation result to the user or application requesting the result.

During and after the computation, the data (or a portion of the data) is often updated. Because the distributed system maintains multiple replicas of the data, it is essential to maintain synchronization among the multiple replicas in order to ensure data consistency. In some embodiments, once a storage node updates its locally stored data by performing a computation task or sub-task, the storage node needs to send an update notification to the master node. The master node can then update its metadata record associated with the data and look up paths to other replicas of the data. Based on the looked up paths, the master node can synchronize all replicas of the data according to the updated data. This approach proactively synchronizes data based on the updated copy. In some embodiments, data consistency is also checked periodically. However, unlike the data scrub scheme used in a distributed storage system where data majority is used as a selection criterion, in the invented system, the updated version can be used as a selection criterion for correct data. In other words, a data replica that is most recently updated can be chosen as the correct copy for data synchronization.

Figure 5:
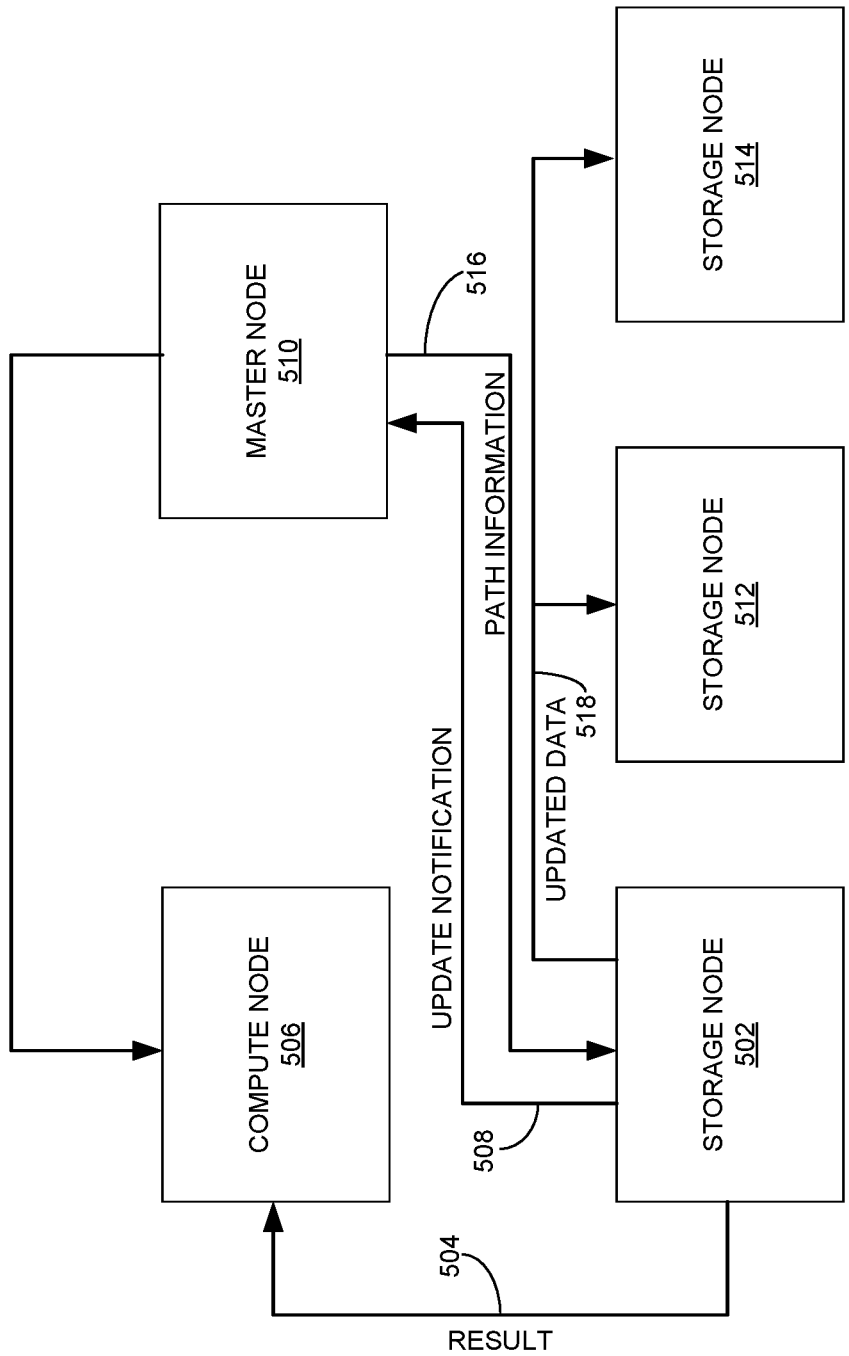
FIG. 5 presents a diagram illustrating the flow of information during data synchronization, according to one embodiment.

FIG. 5 presents a diagram illustrating the flow of information during data synchronization, according to one embodiment. During operation, a storage node 502 can perform a computation task or sub-task, resulting in data stored at storage node 502 being updated. Storage node 502 sends computation result 504 to compute node 506, which is the node assigning the computation task or sub-task. Compute node 506 can gather results from all sub-tasks and return the results to the user or application requesting the result. Moreover, storage node 502 sends an update notification 508 to master node 510, notifying master node 510 that data stored on storage node 502 has been updated. Master node 510 updates its own record (e.g., metadata associated with the data) and looks up paths to other replicas of the data. For example, master node 510 can determine that other replicas of the data are stored in storage nodes 512 and 514. Master node 510 can send the path information 516 to storage node 502, notifying storage node 502 that other replicas are stored in storage nodes 512 and 514. Based on the path information, storage node 502 can send updated data 518 to storage nodes 512 and 514, which then synchronize their local copy of the data to the updated data.

Note that, in certain scenarios, multiple storage nodes may be used to perform a computation task, with each storage node performing a sub-task and updating its local copy of the data based on the local computation result. For example, when each of storage nodes 502, 512, and 514 updates a separate section of a table, each storage node can update its local copy of the table based on the local computation result. To ensure data consistency, each storage node needs to use its updated table section to synchronize corresponding table sections stored at other storage nodes. If storage node 502 updates the first n rows of the table, storage node 502 needs to send the updated first n rows of the table to storage nodes 512 and 514 to allow these two storage nodes to update the first n rows of the table stored locally.

Figure 6:
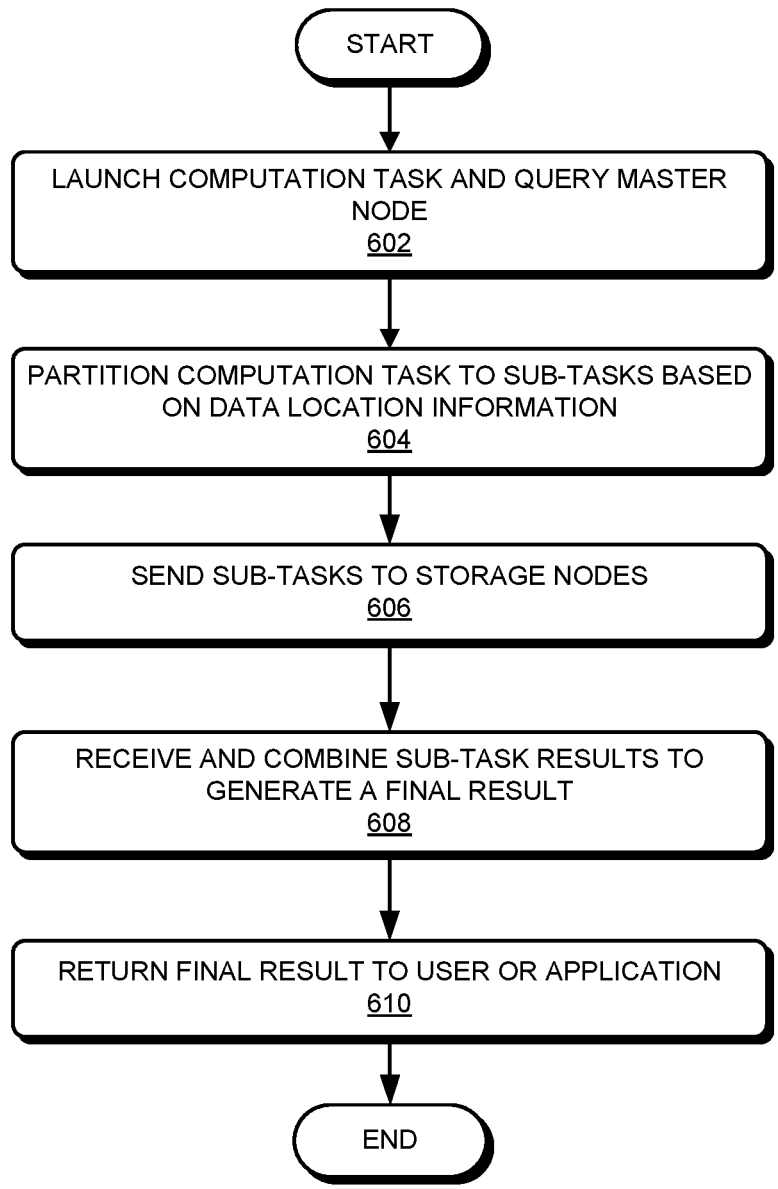
FIG. 6 presents a flowchart illustrating an exemplary process for executing a computation task, according to one embodiment.

FIG. 6 presents a flowchart illustrating an exemplary process for executing a computation task, according to one embodiment. During operation, a compute node launches a computation task and queries the master node path information associated with the data involved in the computation task (operation 602). For example, for e-commerce applications, a computation task can involve updating the price or inventory information associated with a product, and such a computation task often involves updating a table. The compute node can obtain location information of the data (e.g., the table), including replicas of the data, from the master node. In some embodiments, different portions of the required data (e.g., different sections of the table) may be stored on different storage nodes. In such a scenario, the path information can include the location of each data portion.

Upon receiving the location information of the data, the compute node can partition the computation task into a number of sub-tasks based on the data location information (operation 604). More specifically, the computation task can be partitioned in such a way that a respective sub-task only involves data stored within a single storage node. If the computation task is updating a large table, and different sections (e.g., rows or columns) of the table are stored in different nodes, then the compute node can partition the table-updating task into a number of sub-tasks, with each sub-task being updating a section of the table, and each sub-task only updating a section of the table that is stored on a single storage node. This way, all data required for executing the sub-task is located on a single storage node, making it possible for the storage node to execute the sub-task.

The compute node can then send the sub-tasks to corresponding storage nodes based on the previously obtained path info (operation 606). More specifically, if a particular sub-task requires a portion of data, which is stored on a particular storage node according to the path information, the sub-task can be sent to that particular storage node. In the event of multiple replicas of the data existing on multiple storage nodes, the compute node can randomly select a replica to send the sub-task, instead of sending the sub-task to all replicas. In some embodiments, the compute node sends detailed computation instructions associated with a sub-task to its corresponding storage node, thus enabling the storage node to execute the sub-task. The computation instructions can specify what type of operation is to be performed on which data. For example, a table-update instruction may specify that all numbers in the top five rows of a table should be increased by 20% or that the first two columns should be merged. The storage node then loads data from its local drives, which can be SSDs or HDDs, executes the sub-task based on the received computation instruction, and sends the result of the sub-task to the compute node.

The compute node receives results from the storage nodes executing the sub-tasks and combines the sub-task results to generate a final result of the computation task (operation 608). Depending on the need, the compute node may return the final result to the user or application requesting the computation (operation 610). In some embodiments, if the user or application requested multiple computation tasks to be performed, the compute node can return the computation result until all computation tasks have been performed.

Figure 7:
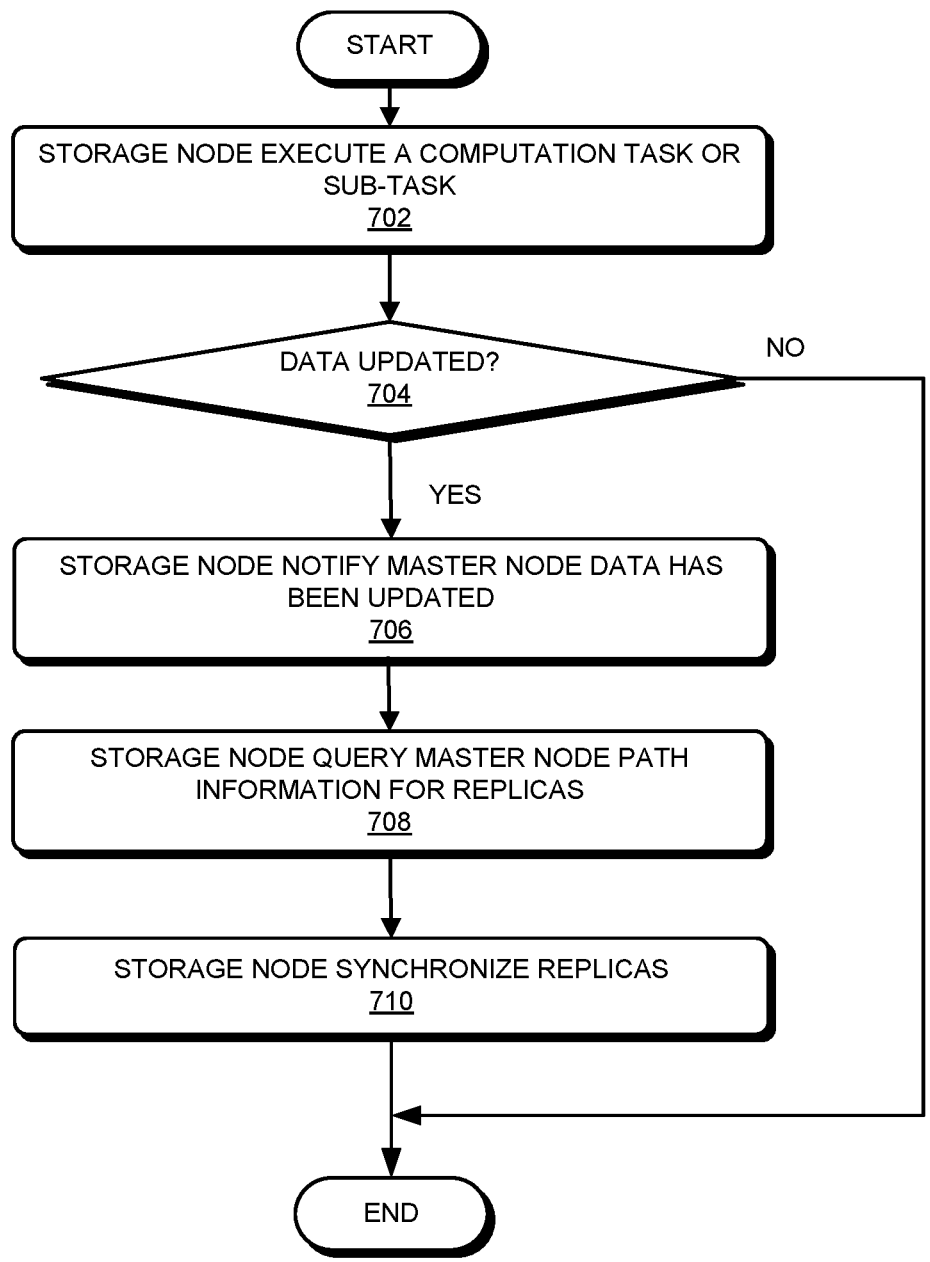
FIG. 7 presents a flowchart illustrating an exemplary process for data synchronization, according to one embodiment.

FIG. 7 presents a flowchart illustrating an exemplary process for data synchronization, according to one embodiment. Note that certain computations generate a result without affecting the stored data, whereas certain computations (e.g., the table-update computation) will update the data stored in the storage nodes. Once the data has been updated, other replicas of the data need to synchronize to the updated data to maintain data consistency. During operation, a storage node can execute a computation task or sub-task offloaded from a compute node by performing a computation based on received computation instructions (operation 702). Subsequently, the storage node can determine whether its locally stored data has been updated by the computation (operation 704). If not, there is no need for data synchronization; the process ends.

If the data has been updated, the storage node can notify the master node that its local data has been updated (operation 706) and queries the master node path information associated WITH other replicas of the data (operation 708). In other words, the storage node with the updated data needs to find the locations of other un-updated copieS of the data. Based on the received path information, the storage node can use its own updated local copy to synchronize other replicas of the data (operation 710). In some embodiments, the storage node with the updated data can send the updated data to other storage nodes storing replicas of the original data such that those other storage nodes can update their local data copy accordingly.

In certain situations, a table and its replicas may be stored on different storage nodes, and each storage node may update a section of the table by performing a sub-task of a table-update operation. To ensure consistency of the table among all the copies, each storage node can synchronize the corresponding sections of the table using its updated table section using a process similar to the one shown in FIG. 7. After all storage nodes having updated table sections have synchronized other copies using their updated sections, the entire table is updated and synchronized among all copies.

Figure 8A:
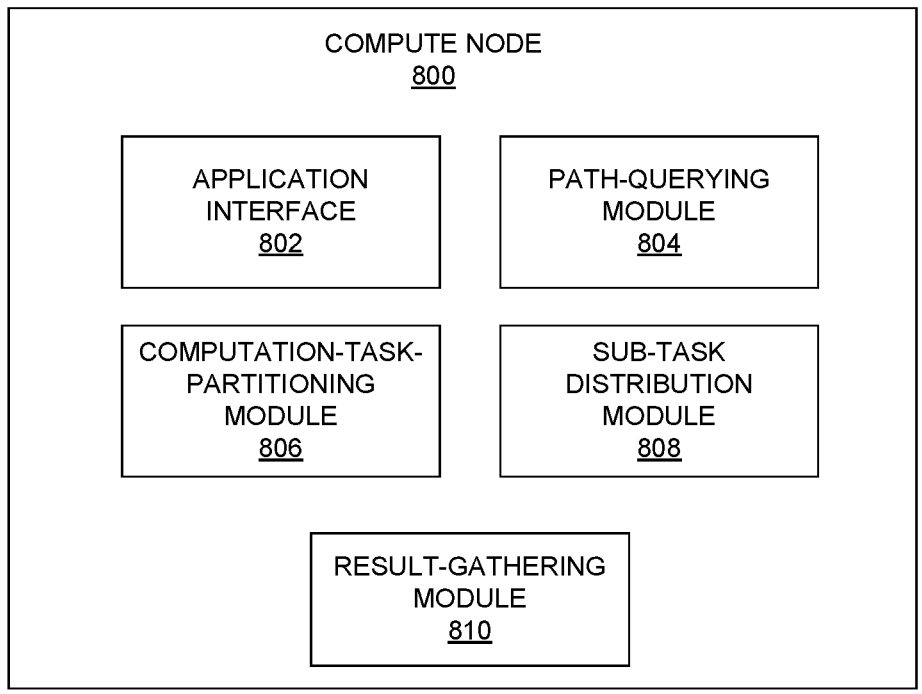
FIG. 8A shows the exemplary structure of a compute node, according to one embodiment.

FIG. 8A shows the exemplary structure of a compute node, according to one embodiment. Compute node 800 can include an application interface 802, a path-querying module 804, a computation-task-partitioning module 806, a sub-task distribution module 808, and a result-gathering module 810.

Application interface 802 can be responsible for interfacing with user applications. More specifically, compute node 800 can receive, via application interface 802, user data and a computation request. Moreover, compute node 800 can return the computation result to the user applications via application interface 802. Path-querying module 804 can be responsible for querying a master node path information associated with data needed for performing a computation. In some embodiments, path-querying module 804 can send the query to the master node via an interface that allows the communication among the nodes within the distributed system. The query can include information used for identifying the data, such as a file name.

Computation-task-partitioning module 806 can be responsible for partitioning a requested computation task to one or more sub-tasks based on the path information associated with the data. More specifically, the partition is done in such a way that any sub-task only requires data included on one storage node, thus ensuring no data migration is needed to execute the sub-task. Sub-task distribution module 808 can be responsible for distributing the partitioned sub-tasks to corresponding storage nodes based on the path information associated with the data. Result-gathering module 810 can be responsible for gathering and combining results of all sub-tasks in order to generate the final result for the computation task.

Figure 8B:
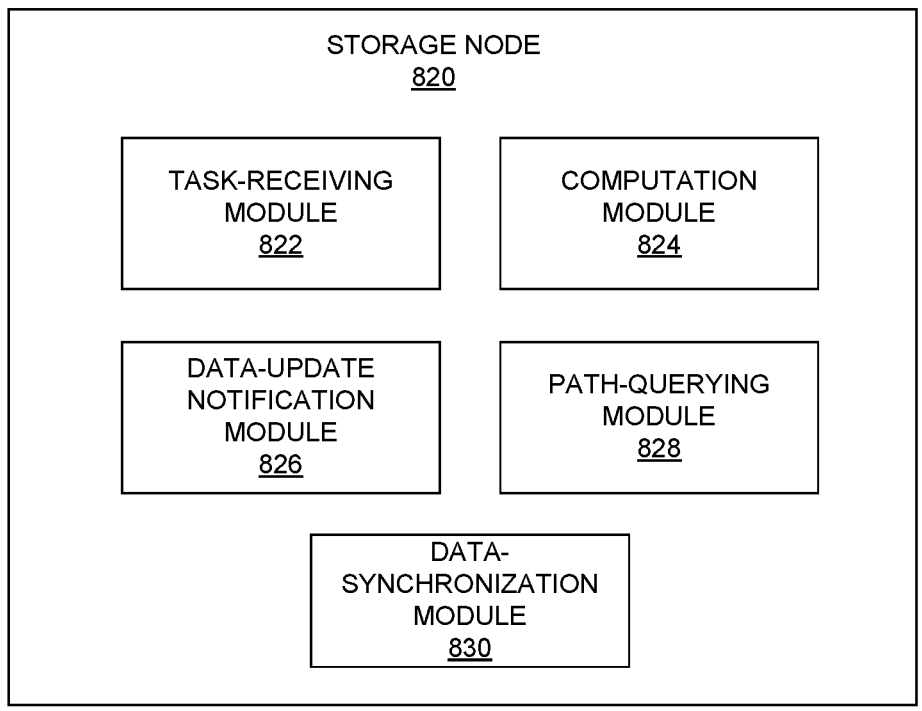
FIG. 8B shows the exemplary structure of a storage node, according to one embodiment.

FIG. 8B shows the exemplary structure of a storage node, according to one embodiment. Storage node 820 can include a task-receiving module 822, a computation module 824, a data-update-notification module 826, a path-querying module 828, and a data-synchronization module 830.

Task-receiving module 822 can be responsible for receiving computation tasks or sub-tasks from a compute node. More specifically, task-receiving module 822 can include computation instructions for performing the received task or sub-task. Computation module 824 can be responsible for performing the computation based on the received computation instruction. To perform the computation, computation module 824 can load the required data from a local drive (e.g., an SSD or HDD). Data-update-notification module 826 can be responsible for sending data-update notifications to the master drive, in response to the data stored in the local drive being updated by the computation. Path-querying module 828 can be responsible for querying the master node for path information associated with the replicas of the data. Data-synchronization module 830 can be responsible for synchronizing, using the updated local data, data replicas stored in other remote storage nodes.

In general, embodiments of the present disclosure provide a solution for reducing the data transfer amount by offloading data-intensive computation to storage nodes. In addition to reducing the amount of data being transferred among the different nodes, which reduces latency and bandwidth consumption, this approach can also reduce the CPU consumption used for data transfer. Moreover, by offloading the data-intensive processing to the storage nodes, the requirement on the cache hit rate of the compute node can be relaxed, hence making it possible for the compute node to have a smaller cache. This disclosure presents the solution for enhancing system performance by placing data based on computation context in the distributed system and offloading computation tasks onto multiple storage nodes based on the data locality. This significantly reduces the data amount loaded from storage clusters to the compute node, so that the novel system is able to reduce the latency, reduce the network bandwidth consumption, reduce the total capacity of the compute cache SSD, and reduce the overall CPU consumption.

In some embodiments, not all computation tasks have been offloaded to the storage nodes. Computation-intensive tasks, which require powerful CPUs, can still be processed by the compute node. In the previously discussed examples, the nodes in the distributed system have been characterized as compute nodes or storage nodes based on their configuration, where compute nodes are configured to have good computation capability and the storage nodes are configured to have large storage capacity. It is also possible for the distributed system to have nodes that are not clearly characterized as compute or storage nodes. These nodes may have relatively powerful CPUs (may not be as powerful as those on a compute node) and relatively large storage capacity (may not be as large as that of a storage node). These nodes can serve as compute nodes or storage nodes, depending on the system needs. The general principle of the embodiments can also be applied to these nodes, meaning that they can launch, or receive from other nodes, computation tasks that involve only local data. They can store data.

Depending on the data location, a node can perform the computation task or offload the computation task to one or more other nodes.

In the disclosed examples, the distributed system can have a master-slave type of architecture, where one or more master nodes maintain the storage logic as well as compute context of the data. It is also possible for a distributed system to have a peer-to-peer type of architecture, and the storage logic and compute context of data can be maintained in a distributed manner among all nodes in the system. In such a scenario, subsequent to receiving a computation request, a compute node may broadcast a query to the whole system to obtain path information associated with the data.

Figure 9:
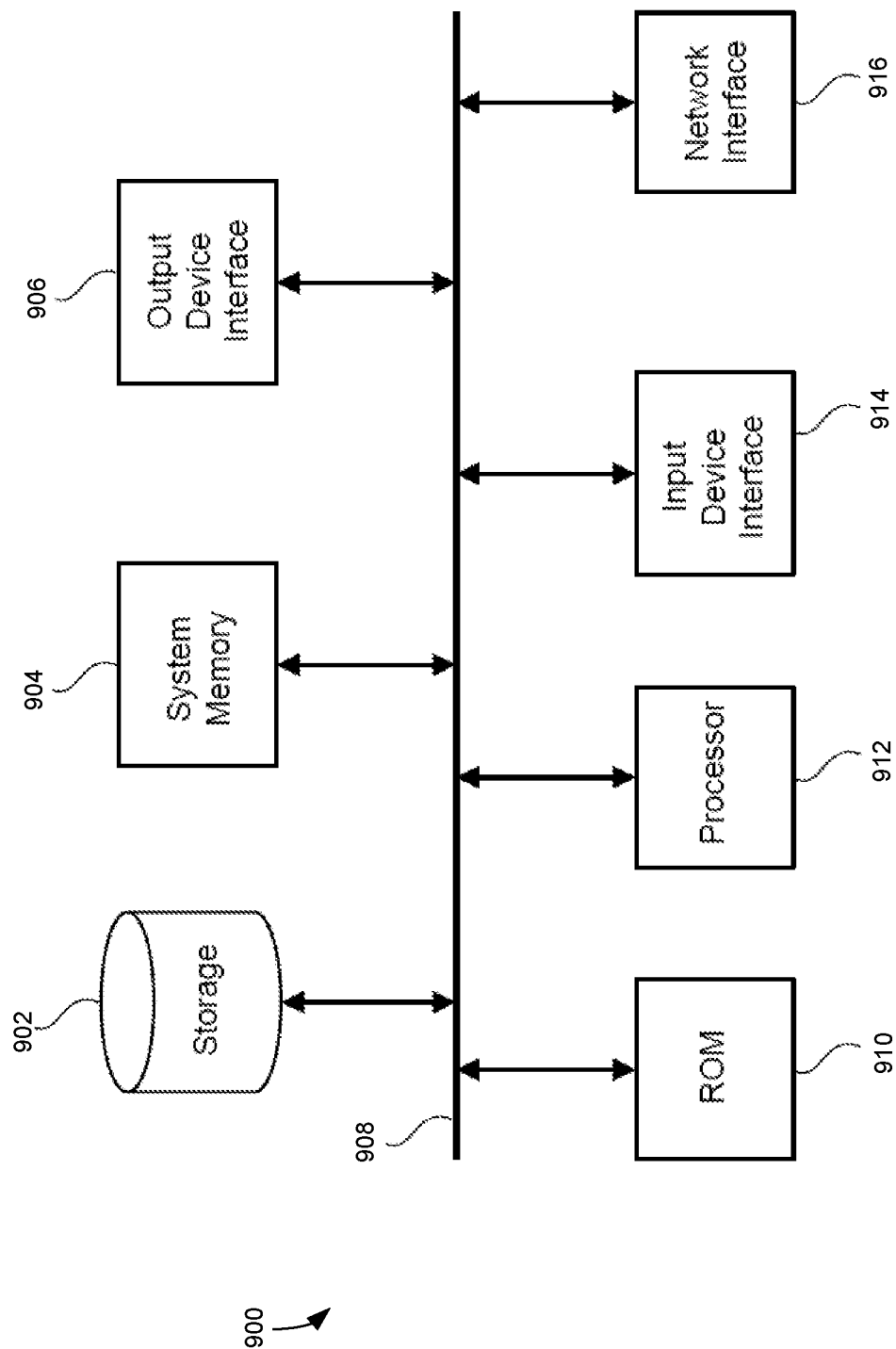
FIG. 9 conceptually illustrates an electronic system, which implements some embodiments of the subject technology.

FIG. 9 conceptually illustrates an electronic system, which implements some embodiments of the subject technology. Electronic system 900 can be a client, a server, a computer, a smartphone, a PDA, a laptop, or a tablet computer with one or more processors embedded therein or coupled thereto, or any other sort of electronic device. Such an electronic system includes various types of computer-readable media and interfaces for various other types of computer-readable media. Electronic system 900 includes a bus 908, processing unit(s) 912, a system memory 904, a read-only memory (ROM) 910, a permanent storage device 902, an input device interface 914, an output device interface 906, and a network interface 916.

Bus 908 collectively represents all system, peripheral, and chipset buses that communicatively connect the numerous internal devices of electronic system 900. For instance, bus 908 communicatively connects processing unit(s) 912 with ROM 910, system memory 904, and permanent storage device 902.

From these various memory units, processing unit(s) 912 retrieves instructions to execute and data to process in order to execute the processes of the subject disclosure. The processing unit(s) can be a single processor or a multi-core processor in different implementations.

ROM 910 stores static data and instructions that are needed by processing unit(s) 912 and other modules of the electronic system. Permanent storage device 902, on the other hand, is a read-and-write memory device. This device is a non-volatile memory unit that stores instructions and data even when electronic system 900 is off. Some implementations of the subject disclosure use a mass-storage device (such as a magnetic or optical disk and its corresponding disk drive) as permanent storage device 902.

Other implementations use a removable storage device (such as a floppy disk, flash drive, and various types of disk drive) as permanent storage device 902. Like permanent storage device 902, system memory 904 is a read-and-write memory device. However, unlike storage device 902, system memory 904 is a volatile read-and-write memory, such as a random access memory. System memory 904 stores some of the instructions and data that the processor needs at runtime. In some implementations, the processes of the subject disclosure are stored in system memory 904, permanent storage device 902, and/or ROM 910. From these various memory units, processing unit(s) 912 retrieves instructions to execute and data to process in order to execute the processes of some implementations.

Bus 908 also connects to input and output device interfaces 914 and 906. Input device interface 914 enables the user to communicate information and send commands to the electronic system. Input devices used with input device interface 914 include, for example, alphanumeric keyboards and pointing devices (also called "cursor control devices"). Output device interface 906 enables, for example, the display of images generated by the electronic system 900. Output devices used with output device interface 906 include, for example, printers and display devices, such as cathode ray tubes (CRT) or liquid crystal displays (LCD). Some implementations include devices such as a touchscreen that function as both input and output devices.

Finally, as shown in FIG. 9, bus 908 also couples electronic system 900 to a network (not shown) through a network interface 916. In this manner, the computer can be a part of a network of computers (such as a local area network ("LAN"), a wide area network ("WAN"), an intranet, or a network of networks, such as the Internet. Any or all components of electronic system 900 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A distributed computing system, the system comprising:
    a compute cluster comprising one or more compute nodes, wherein a respective compute node comprises a first processor having a first processing speed;
    a storage cluster comprising a plurality of storage nodes, wherein a respective storage node comprises a second processor having a second processing speed that is lower than the first processing speed; and
    a master node configured to:
        send data-placement path information associated with data associated with a computation task to a compute node to allow the compute node to send a computation instruction associated with the computation task to a storage node identified based on the data-placement path information;
        receive, from the identified storage node, a data-update notification after the second processor having the second processing speed of the identified storage node performs the computation task and sends a computation result to the compute node; and
        perform a lookup for data paths associated with replicas of the data stored on other storage nodes within the storage cluster and send the data paths to the identified storage node, thereby facilitating the identified storage node to synchronize the replicas of the data stored on the other storage nodes.

2. The distributed computing system of claim 1, wherein the master node is further configured to:
    maintain compute context associated with the data; and
    generate data-placement paths based on the compute context.

3. The distributed computing system of claim 1, wherein the compute node is further configured to:

partition the computation task into a number of sub-tasks based on the path information, which indicate locations of the data on the plurality of storage nodes, wherein the computation task is partitioned in such a way that a respective sub-task only requires data stored on a single storage node; and send the respective sub-task to the corresponding single storage node to allow the single storage node to execute the respective sub-task.

4. The distributed computing system of claim 3, wherein the compute node is further configured to receive computation results from multiple storage nodes executing the sub-tasks to generate a combined result.

5. The distributed computing system of claim 1, wherein the compute node is further configured to:

receive data to be written into the storage cluster;

group the to-be-written data into one or more data chunks based on compute context associated with the to-be-written data; and submit the compute context associated with the to-be-written data to the master node.

6. The distributed computing system of claim 5, wherein the compute node is further configured to:

receive, from the master node, data-placement paths for the data chunks, wherein a respective data-placement path indicates a storage node for storing a corresponding data chunk; and write the data chunks into corresponding storage nodes identified by the data-placement paths.

7. The distributed computing system of claim 5, wherein the master node is configured to store the compute context as part of metadata of the to-be-written data.

8. The distributed computing system of claim 1, wherein the identified storage node is further configured to:

execute the computing task;

determine whether execution of the computing task updates the data; and in response to determining that the data is updated, send the data-update notification to the master node.

9. A computer-implemented method for offloading computation tasks from a compute cluster comprising one or more compute nodes to a storage cluster comprising a plurality of storage nodes in a distributed computing system, the method comprising:

sending, by a master node, data-placement path information associated with data associated with a computation task to a compute node to allow the compute node to send a computation instruction associated with the computation task to a storage node identified based on the data-placement path information, wherein the compute node comprises a first processor having a first processing speed, and wherein the storage node comprises a second processor having a second processing speed that is lower than the first processing speed;

receiving from the identified storage node, a data-update notification after the second processor having the second processing speed of the identified storage node performs the computation task and sends a computation result to the compute node; and performing a lookup for data paths associated with replicas of the data stored on other storage nodes within the storage cluster and send the data paths to the identified storage node, thereby facilitating the identified storage node to synchronize the replicas of the data stored on the other storage nodes.

10. The computer-implemented method of claim 9, wherein the master node maintains compute context associated with the data, and wherein the data-placement path information comprises data-placement paths generated by the master node based on the compute context.

11. The computer-implemented method of claim 9, further comprising:

partitioning the computation task into a number of sub-tasks based on the path information, which indicate locations of the data on the plurality of storage nodes, wherein the computation task is partitioned in such a way that a respective sub-task only requires data stored on a single storage node; and sending the respective sub-task to the corresponding single storage node to allow the single storage node to execute the respective sub-task.

12. The computer-implemented method of claim 11, further comprising receiving, by the compute node, computation results from multiple storage nodes executing the sub-tasks to generate a combined result.

13. The computer-implemented method of claim 9, further comprising:

receiving, by the compute node, data to be written into the storage cluster;

grouping the to-be-written data into one or more data chunks based on compute context associated with the to-be-written data; and submitting the compute context associated with the to-be-written data to the master node.

14. The computer-implemented method of claim 13, further comprising:

receiving, by the compute node from the master node, data-placement paths for the data chunks, wherein a respective data-placement path indicates a storage node for storing a corresponding data chunk; and writing the data chunks into corresponding storage nodes identified by the data-placement paths.

15. The computer-implemented method of claim 13, wherein the master node is configured to store the compute context as part of metadata of the to-be-written data.

16. The computer-implemented method of claim 9, further comprising:

executing, by the identified storage node, the computing task;

determining whether execution of the computing task updates the data; and in response to determining that the data is updated, sending the data-update notification to a master node of the distributed computing system.

* * * * *